UNITED STATES PATENT OFFICE.

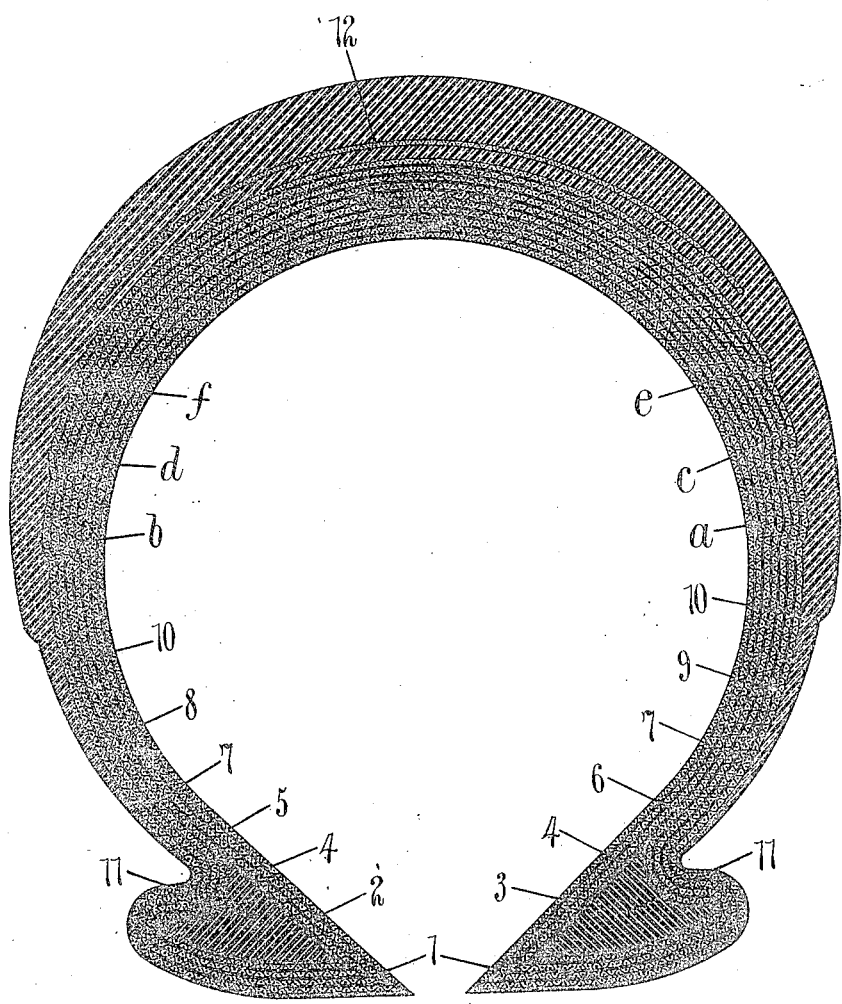

HENRY DECH, OF TRENTON, NEW JERSEY, ASSIGNOR TO EUREKA TIRE COMPANY, OF TRENTON, NEW JERSEY, A CORPORATION OF NEW JERSEY.

VEHICLE-TIRE.

1,165,577.

Specification of Letters Patent.

Patented Dec. 28, 1915.

Application filed July 15, 1913. Serial No. 779,131.

*To all whom it may concern:*

Be it known that I, HENRY DECH, a citizen of the United States, and resident of Trenton, in the county of Mercer and State of New Jersey, have invented a new and useful Improvement in Vehicle-Tires, of which the following is a specification.

This invention relates to vehicle tires and more particularly to pneumatic tires. In its most definite form, it pertains to open bellied casings for pneumatic tires.

The object is to greatly increase the strength, wear resisting and puncture proof qualities of the tire without perceptibly diminishing its resiliency; and, at the same time, lessen the so-called internal friction in the tire when in use on a vehicle.

The casings for pneumatic tires are commonly constructed on the open bellied principle, i. e., they are substantially horse-shoe shape in cross section; and consist, in general, of a carcass composed of a plurality of layers of fabric, protected by an outer covering of rubber compound. The carcass is generally constructed by stretching strips of bias fabric, impregnated with unvulcanized rubber, about a metallic annulus or core and forming the edges of the strips of fabric down about the sides thereof. Owing to the considerable difference between the inner diameter and the outer diameter of the core, it is necessary to stretch the central portion of the strips of fabric which lie upon the outer periphery of the core, practically to their elastic limit in order that it may be possible to form the edges of the strips of fabric smoothly down upon the sides of the core. The entire operation of making and vulcanizing these casings is familiar in the art and will not be here described, reference being made merely to the single step referred to in order to point out one of the advantages of my invention.

The great tension which is put upon the center of the layers of fabric, results in a structure which has been stretched, at its outer periphery, to its reasonable elastic limit, so far as any further peripheral extension is concerned. Consequently, the undulations to which the tread or outer portion of the tire is subjected during its use on a vehicle in motion, generate a tremendous amount of internal friction in this part of the tire, which tends to greatly lessen the life of the tire by weakening the homogeneity of the tire, and also consumes a great amount of the motive power provided for propelling the vehicle. It is a scientifically established fact that one of the greatest sources of loss of power between the engine and the road in a well designed motor vehicle, is this internal friction in the tires.

In constructing the tire casings of the general kind mentioned, sufficient layers of fabric are used to give the tire considerable strength and wear resisting qualities, but it has been found impracticable to incorporate a sufficient number of these layers of fabric in a tire to give it a practically puncture-proof structure and extraordinary wearing qualities, owing to the fact that such increase in the fabric renders the tire extremely stiff in its side walls, thus materially reducing its resiliency, and also tends to increase the amount of internal friction.

With the above thoughts in mind, I have devised a tire structure in which certain of the layers of fabric are so disposed as to remove the necessity for great stretching at the outer periphery of the tire carcass; while that portion of these layers of fabric which is at the periphery of the tire carcass is more easily stretchable than the portion of the layers which is located at the periphery of the tire in the ordinary form of construction; and this new tire structure also contains a relatively great number of layers of fabric in its outer portion, without any increase in the number of layers of fabric employed in the side walls of the tire. I thus obviate the defects and obtain the advantages above set forth.

A practical embodiment of my invention is represented in the accompanying drawing, which shows an enlarged cross section of a completed clencher casing.

In making this tire casing I preferably apply the first strip or layer of fabric, denoted by 1, about an appropriate core or mandrel in the usual manner, the layer 1 extending transversely completely about the mandrel so that it will reach from margin to margin in the completed tire. This layer 1, may be stretched on in the usual manner above detailed. In applying the next layer, I depart from the common procedure, in that I select a layer which is narrower than the layer 1, and this layer, denoted by 2, extends transversely from the left hand inner portion of the tire, as shown in the drawing, to a point denoted by $a$ in the opposite side wall of the tire above the edge or margin. The next layer of fabric, denoted by 3, is applied in a manner similar to the layer 2, except that it extends transversely from the right hand margin of the tire, as shown in the drawing, to a point denoted by $b$ in the opposite side wall of the tire, at substantially the same distance from the margin as the point $a$. It will be noted that these layers 2, 3, will not have to be stretched nearly as much as the ordinary form of layer of fabric, represented in the present case by the layer 1, owing to the fact that the edges of the layers 2, 3, do not both extend down to the beads or margins of the tire. Furthermore, the portion of the layers 2, 3, which is at the periphery of the tire is relatively nearer to the edge of the said layers and hence is more easily stretchable.

The fourth layer, denoted by 4, is now stretched on outside of the layers 2, 3, in the same manner as the layer 1, its edges extending from margin to margin of the tire. After this layer 4 is in position, layers 5 and 6 are applied in the same manner as the layers 2 and 3, the layer 5 extending transversely from the left hand margin of the casing to a point denoted by $c$ in the opposite side wall; and the layer 6 extending transversely from the right hand bead or margin of the casing to a point denoted by $d$ in the opposite side wall. These layers are followed by a layer 7, which is stretched on in the same manner as the layers 1 and 4 extending transversely from margin to margin of the casing. Over this layer 7 I apply two more layers 8 and 9 in the same manner as the layers 2, 3, and 5, 6, the layer 8 extending transversely from the left hand margin of the tire to a point denoted by $e$ in the opposite side wall; and the layer 9 extending from the right hand margin of the tire to a point denoted by $f$ in the opposite side wall. A final layer of fabric 10 may now be applied to be stretched on in the same manner as the layers 1, 4 and 7, extending transversely from margin to margin of the casing.

It will be understood that the above description has been directed to the construction of a tire casing corresponding to the so-called seven ply clencher casing, and that after the appropriate number of layers have been applied, including the layers 1 to 4 in the present instance, bead cores 11 may be inserted in the ordinary manner, and the succeeding layers of fabric placed outside of these bead cores 11 at the margins of the casing.

After the tire has been constructed as far as described, it may be completed by the addition of the rubber stock forming the so-called cushion and tread, with or without the insertion of one or more breaker strips 12. After the building of the casing has been thus completed, it may be vulcanized or cured in any desired manner, but I prefer and recommend the so-called one-cure wrapped tread method.

It will be seen that the above described tire has its margins or clencher edges and its inner body portion for a considerable distance thereabove, of exactly the same cross section as a regular seven ply clencher casing, while the outer body portion or tread of the tire has ten layers of fabric therein; thus I have constructed this tire carcass so as to have increased thickness in its outer body portion while the side walls and margin maintain the same size and resiliency as the conventional form. Furthermore, the use of layers of fabric 2, 3, 5, 6, 8, 9, tends to decrease the internal friction in the tire. And again, the layers 2, 3, 5, 6, 8, 9, are so arranged that each succeeding pair has a less transverse extent that the preceding one, and hence the increase in thickness of the outer body portion of the tire carcass is graduated from the inner side wall of the tire to the outer portion. These advantages are obtained in a tire carcass which is homogenous and uniformly bonded together.

I desire to be understood that I do not intend to limit myself to a particular number of the narrow or wide layers of fabric, or to a particular size or configuration of tire, or to a particular relative disposition of the wide and narrow layers of fabric, or to a particular extent of the narrow layers, or to any other specific features of the tire herein described for the purpose of clearly illustrating the invention, except in so far as such details may be specified in the claims; as it is obvious that various changes may be resorted to which are well within the scope of my invention.

What I claim is:—

1. A tire including layers of fabric, certain of said layers extending transversely from margin to margin of the said tire, and others of said layers extending transversely from one margin of the tire to a point in the opposite side wall above the other margin, the said last-mentioned layers overlapping each other in the outer body portion of the tire, and each pair of said last-mentioned layers lying between a pair of said first-mentioned layers.

2. A tire including layers of fabric, certain of said layers extending transversely from margin to margin of the said tire, and others of said layers extending transversely from one margin of the tire to a point in the opposite side wall above the other margin, the said last-mentioned layers overlapping each other in the outer body portion of the tire and being arranged in pairs, each succeeding outer pair having less transverse extent than the adjacent inner pair.

In testimony, that I claim the foregoing as my invention, I have signed my name in presence of two witnesses, this 11th day of July, 1913.

HENRY DECH.

Witnesses:
T. I. CURTIS,
HARRY P. MESSLER.